(12) United States Patent
Peters

(10) Patent No.: US 12,539,746 B1
(45) Date of Patent: Feb. 3, 2026

(54) DEPLOYABLE VEHICLE COVER

(71) Applicant: Takisha Peters, Bayonne, NJ (US)

(72) Inventor: Takisha Peters, Bayonne, NJ (US)

(*) Notice: Subject to any disclaimer, the term of this patent is extended or adjusted under 35 U.S.C. 154(b) by 669 days.

(21) Appl. No.: 17/953,414

(22) Filed: Sep. 27, 2022

(51) Int. Cl.
| | |
|---|---|
| *B60J 11/04* | (2006.01) |
| *E04B 1/343* | (2006.01) |
| *E04B 1/344* | (2006.01) |
| *E04H 6/04* | (2006.01) |
| *E04H 15/38* | (2006.01) |

(52) U.S. Cl.
CPC ........... *B60J 11/04* (2013.01); *E04B 1/34384* (2013.01); *E04B 1/3448* (2013.01); *E04H 6/04* (2013.01); *E04H 15/38* (2013.01)

(58) Field of Classification Search
CPC ................................ E04B 1/3448; B60J 11/04
See application file for complete search history.

(56) References Cited

U.S. PATENT DOCUMENTS

| | | | | |
|---|---|---|---|---|
| 3,906,968 | A * | 9/1975 | Black | E04H 15/38 |
| | | | | 135/132 |
| 4,425,929 | A * | 1/1984 | Von Mosshaim | E04H 15/38 |
| | | | | 52/63 |
| 5,746,237 | A * | 5/1998 | Arnic | E04H 15/38 |
| | | | | 52/DIG. 14 |
| 7,051,481 | B2 * | 5/2006 | Delavega | E04H 6/04 |
| | | | | 52/64 |
| 7,562,928 | B1 | 7/2009 | Morazan | |
| D671,882 | S | 12/2012 | Glasgo | |
| 8,397,440 | B1 * | 3/2013 | Ceballos | E04H 15/38 |
| | | | | 135/132 |
| 8,419,107 | B2 | 4/2013 | Manchanda | |
| 10,119,296 | B2 * | 11/2018 | Deal | E04H 15/38 |
| 10,220,693 | B2 | 3/2019 | Yakubu | |
| 2005/0121937 | A1 | 6/2005 | Hudgins | |
| 2006/0214465 | A1 | 9/2006 | Chau | |
| 2011/0006049 | A1 | 1/2011 | Thompson, Sr. | |
| 2019/0106902 | A1 * | 4/2019 | Irizarry | B60J 11/04 |
| 2019/0193544 | A1 | 6/2019 | Gallego | |

FOREIGN PATENT DOCUMENTS

| | | | | |
|---|---|---|---|---|
| CN | 111425032 A | * | 7/2020 | |
| DE | 19757075 A1 | * | 6/1999 | ............. E04H 15/38 |
| WO | WO-2014091258 A2 | * | 6/2014 | ............. E04H 15/38 |

* cited by examiner

Primary Examiner — David R Dunn
Assistant Examiner — Danielle Jackson

(57) ABSTRACT

The deployable vehicle cover is a mechanical device. The deployable vehicle cover is configured for use with a vehicle. The deployable vehicle cover creates a protected space that contains the vehicle. The deployable vehicle cover protects the vehicle from the weather. The deployable vehicle cover is a collapsible structure. The deployable vehicle cover is a remotely controlled structure. The deployable vehicle cover comprises a drive mount, a supporting mount, and a framework structure. The framework structure attaches to the drive mount and the supporting mount. The supporting mount forms a mechanical linkage with the drive mount. The framework structure forms the protected space that contains the vehicle. The drive mount generates the motive forces necessary to deploy and retract the framework structure. The drive mount is remotely controlled.

12 Claims, 6 Drawing Sheets

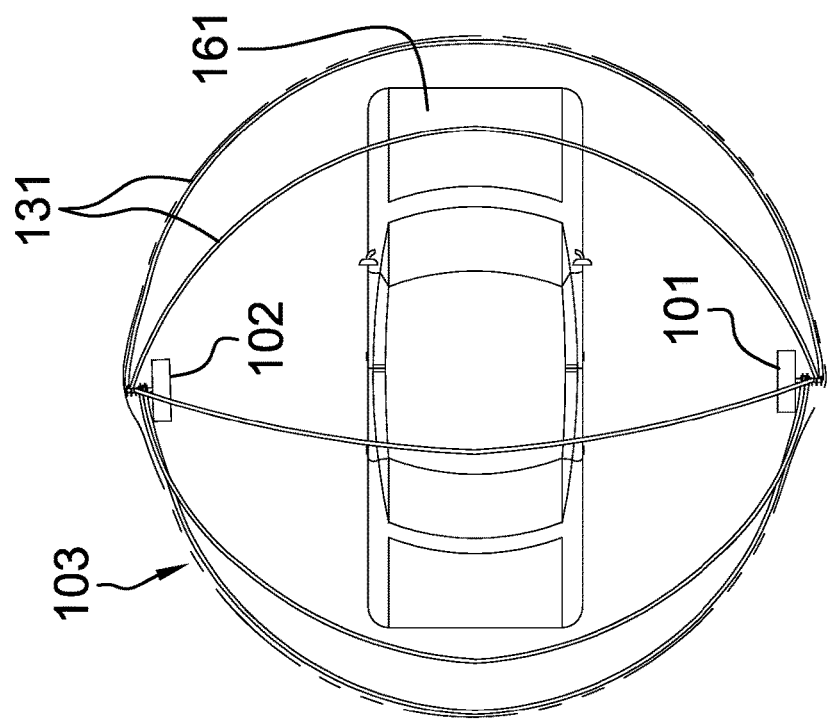
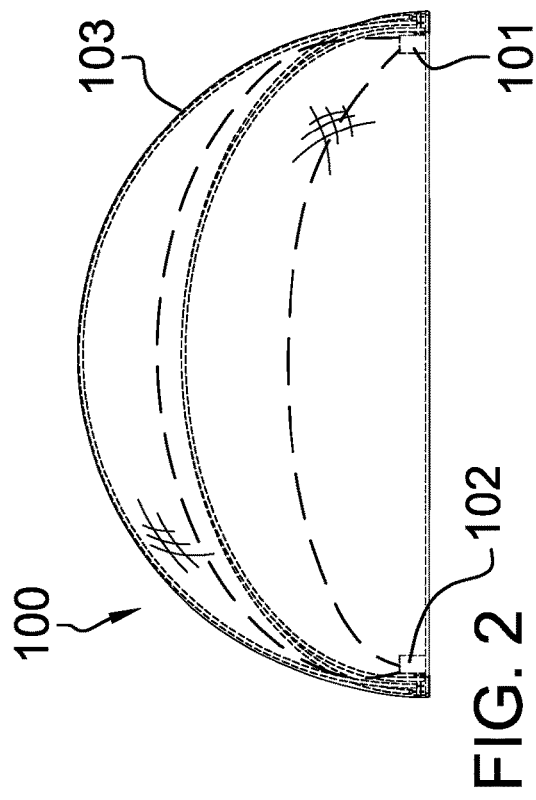
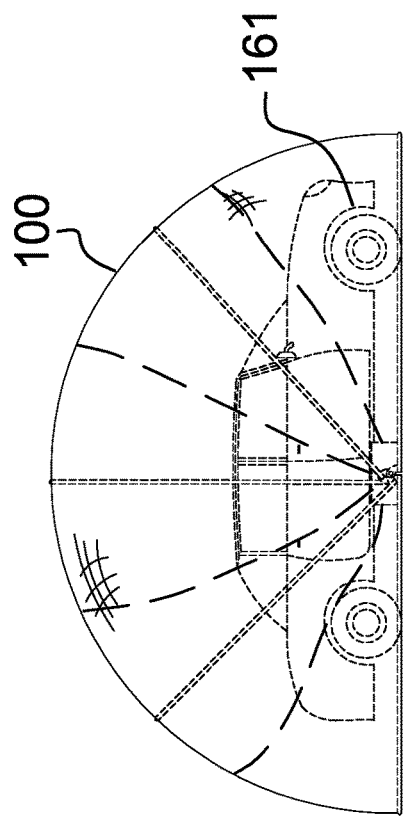

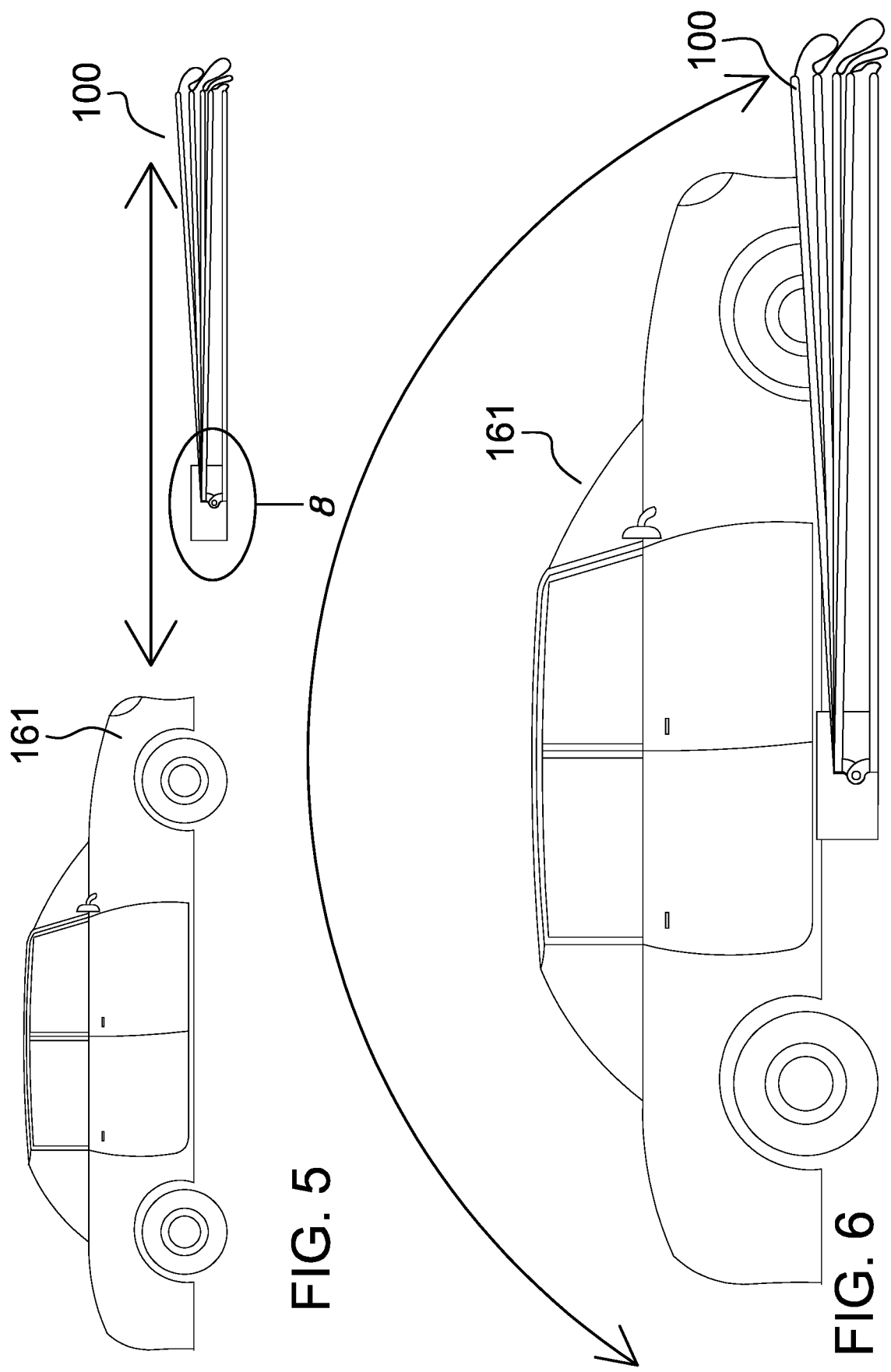

DEPLOYABLE VEHICLE COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of removable external protective coverings configured to cover entire vehicles. (B60J11/04)

Summary of Invention

The deployable vehicle cover is a mechanical device. The deployable vehicle cover is configured for use with a vehicle. The deployable vehicle cover creates a protected space that contains the vehicle. The deployable vehicle cover protects the vehicle from the weather. The deployable vehicle cover is a collapsible structure. The deployable vehicle cover is a remotely controlled structure. The deployable vehicle cover comprises a drive mount, a supporting mount, and a framework structure. The framework structure attaches to the drive mount and the supporting mount. The supporting mount forms a mechanical linkage with the drive mount. The framework structure forms the protected space that contains the vehicle. The drive mount generates the motive forces necessary to deploy and retract the framework structure. The drive mount is remotely controlled.

These together with additional objects, features and advantages of the deployable vehicle cover will be readily apparent to those of ordinary skill in the art upon reading the following detailed description of the presently preferred, but nonetheless illustrative, embodiments when taken in conjunction with the accompanying drawings.

In this respect, before explaining the current embodiments of the deployable vehicle cover in detail, it is to be understood that the deployable vehicle cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the deployable vehicle cover.

It is therefore important that the claims be regarded as including such equivalent construction insofar as they do not depart from the spirit and scope of the deployable vehicle cover. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a front view of an embodiment of the disclosure.

FIG. 3 is a side view of an embodiment of the disclosure.

FIG. 4 is a top view of an embodiment of the disclosure.

FIG. 5 is an in-use view of an embodiment of the disclosure.

FIG. 6 is an in-use view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
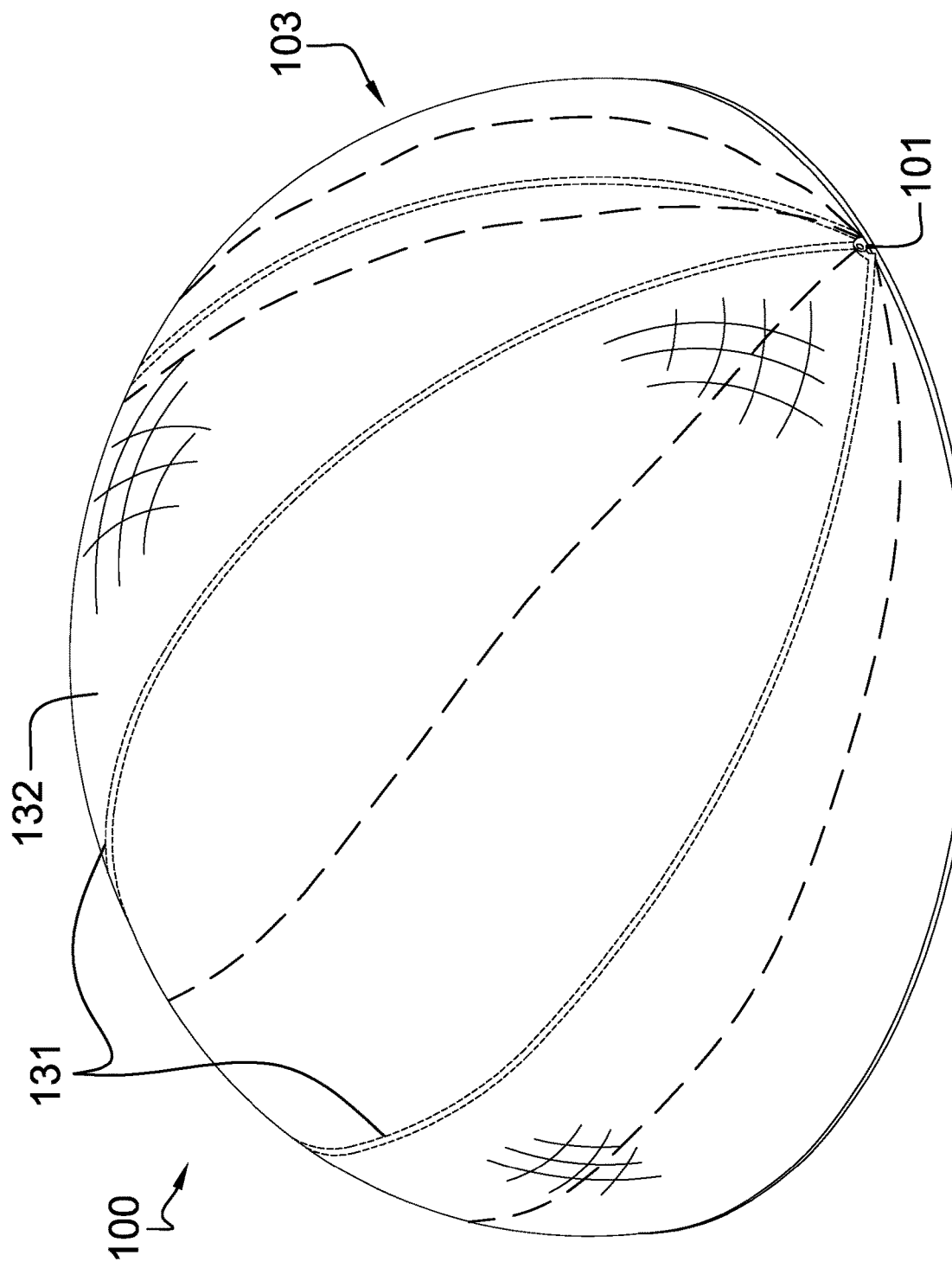
FIG. 1 is a perspective view of an embodiment of the disclosure.
Figure 7:
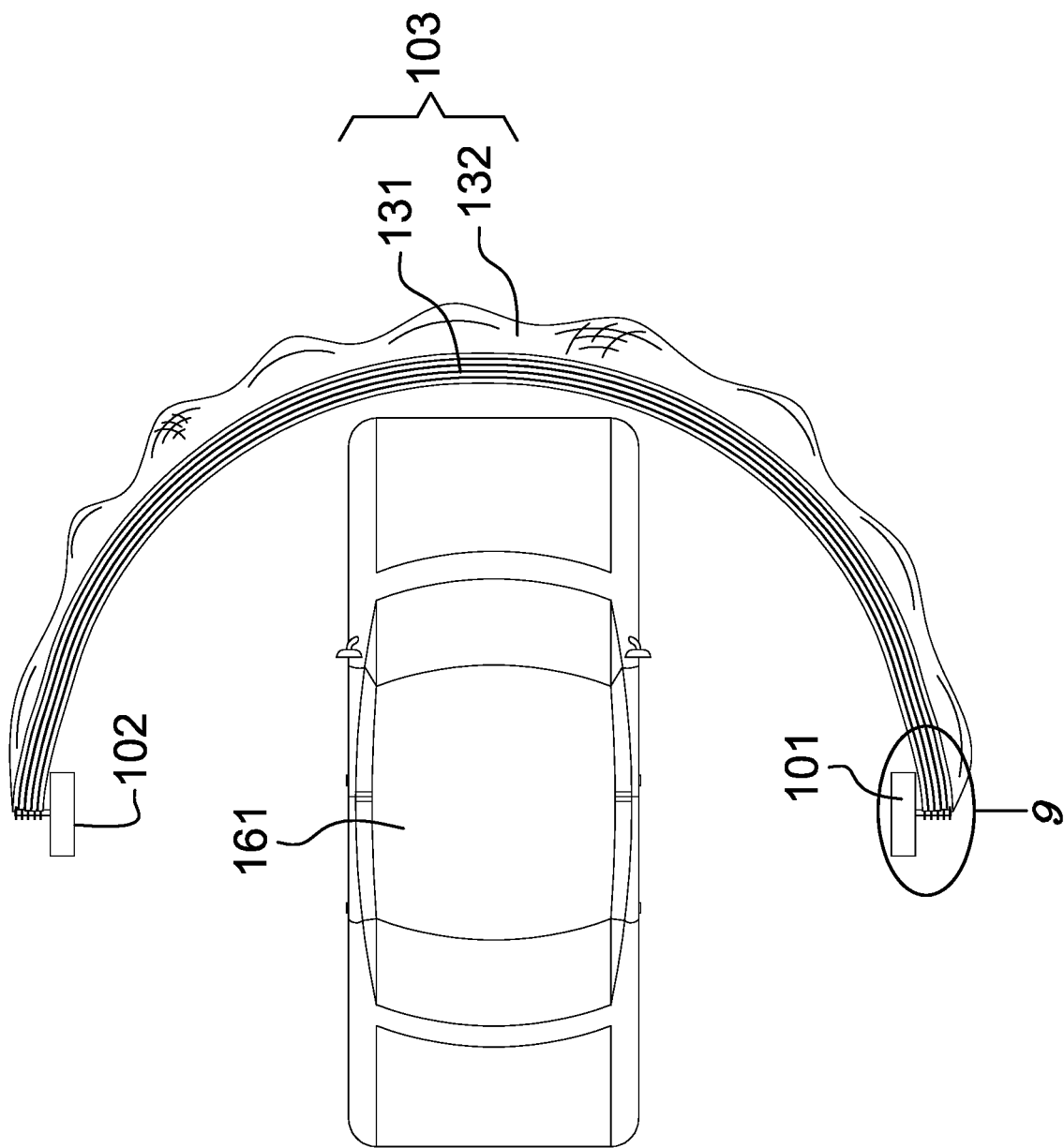
FIG. 7 is an in-use view of an embodiment of the disclosure.
Figure 8:
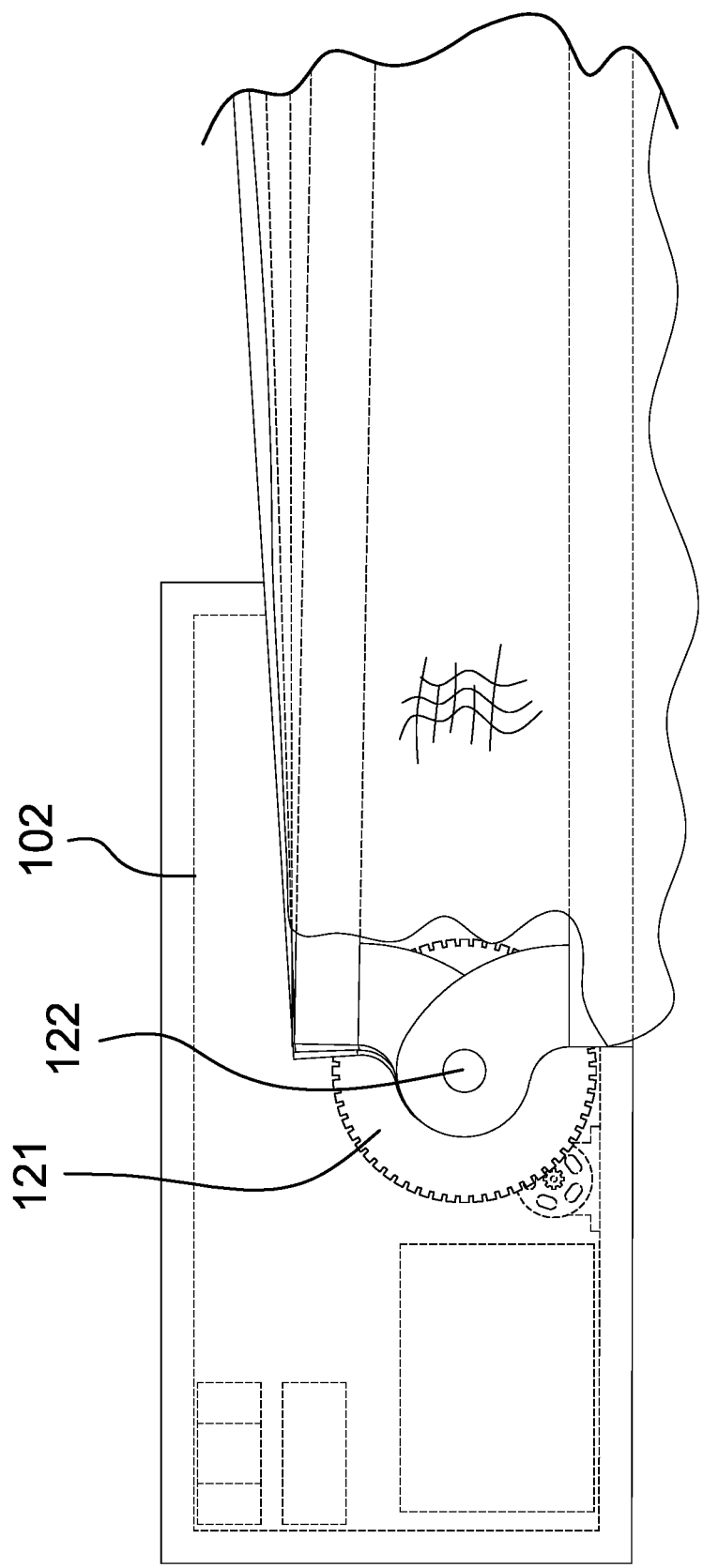
FIG. 8 is a detail view of an embodiment of the disclosure.
Figure 9:
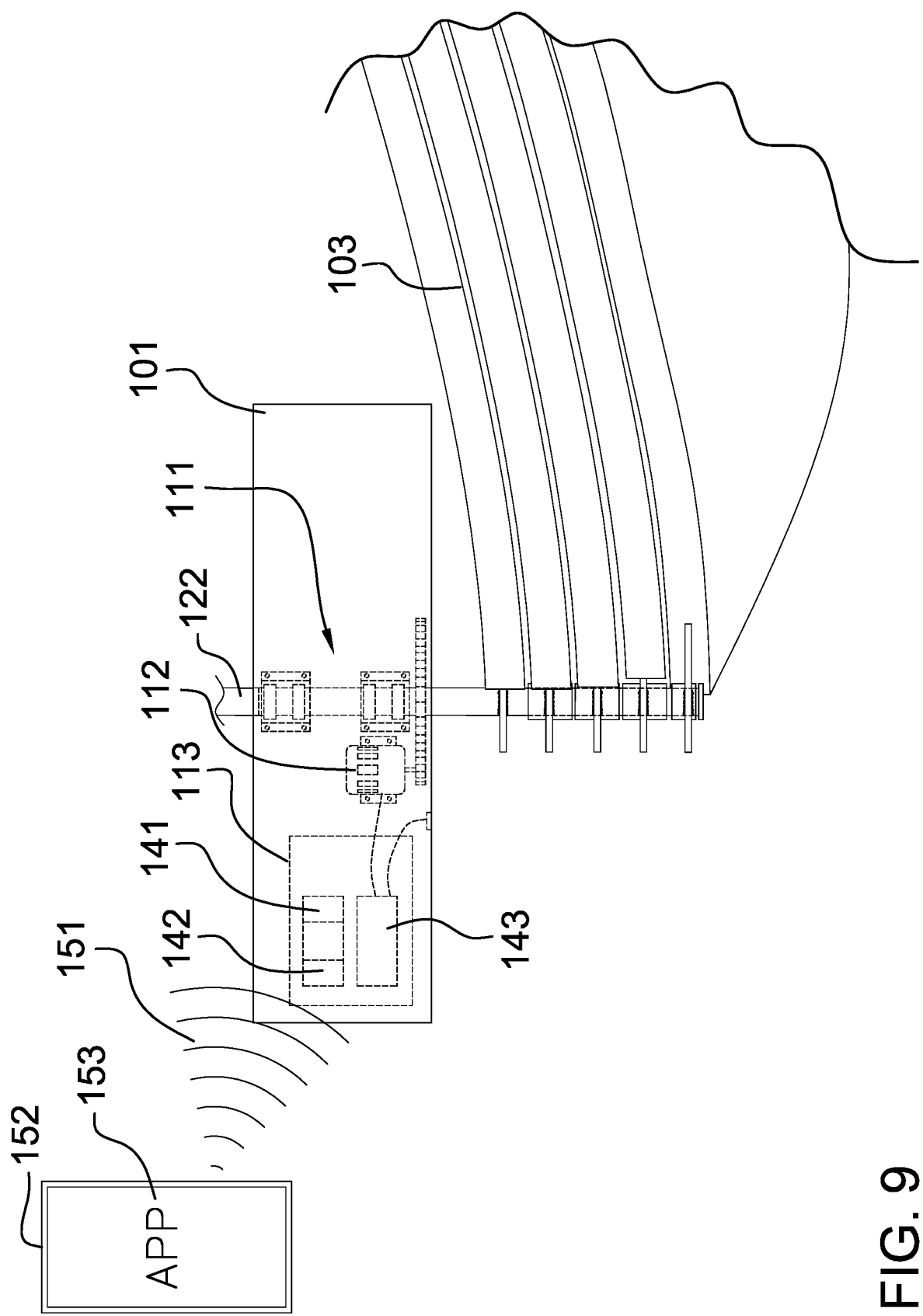
FIG. 9 is a detail view of an embodiment of the disclosure.

Detailed reference will now be made to one or more potential embodiments of the disclosure, which are illustrated in FIGS. 1 through 9.

The deployable vehicle cover 100 (hereinafter invention) is a mechanical device. The invention 100 is configured for use with a vehicle 161. The invention 100 creates a protected space that contains the vehicle 161. The invention 100 protects the vehicle 161 from the weather. The invention 100 is a collapsible structure. The invention 100 is a remotely controlled structure. The invention 100 comprises a drive mount 101, a supporting mount 102, and a framework structure 103. The framework structure 103 attaches to the drive mount 101 and the supporting mount 102. The supporting mount 102 forms a mechanical linkage with the drive mount 101. The framework structure 103 forms the protected space that contains the vehicle 161. The drive mount 101 generates the motive forces necessary to deploy and retract the framework structure 103. The drive mount 101 is remotely controlled.

The framework structure 103 is a mechanical structure. The framework structure 103 is a rotating structure. The framework structure 103 forms the protected space that encloses the vehicle 161. The drive mount 101 controls the operation of the framework structure 103. The framework structure 103 comprises a plurality of framework arms 131 and a canopy structure 132.

Each of the plurality of framework arms 131 is a non-Euclidean prism structure. Each of the plurality of framework arms 131 is a rigid structure. Each of the plurality of framework arms 131 is a load bearing structure. Each of the plurality of framework arms 131 transfers a portion of the load of the canopy to the supporting mount 102. Each of the plurality of framework arms 131 attaches to the drive transmission 111 to the drive mount 101. Each of the plurality of framework arms 131 attaches to the support gearing structure 121 to the supporting mount 102.

Each of the plurality of framework arms 131 transfers a portion of the load of the canopy to the drive mount 101. Each of the plurality of framework arms 131 is a rotating structure. Each of the plurality of framework arms 131 elevates the canopy structure 132 above the vehicle 161 when the framework structure 103 is rotated into a deployed position.

The canopy structure 132 attaches to the plurality of framework arms 131. The canopy structure 132 is a sheeting structure. The canopy structure 132 is a fluid impermeable structure. The canopy structure 132 is a flexible structure. The canopy structure 132 forms a protected space that encloses the vehicle 161 when the plurality of framework arms 131 are rotated into the deployed position. The canopy structure 132 forms a folded structure when the plurality of framework arms 131 are rotated into the retracted position.

The drive mount 101 is a mechanical structure. The drive mount 101 physically attaches to the framework structure 103. The drive mount 101 deploys the protected space formed by the framework structure 103 around the vehicle 161. The drive mount 101 retracts the framework structure 103 to release the vehicle 161 from the protected space. The drive mount 101 is an electrically powered device. The drive mount 101 is a remotely controlled device. The drive mount 101 comprises a drive transmission 111, an electric motor 112, and a control circuit 113.

The drive transmission 111 is a mechanical structure. The drive transmission 111 mechanically attaches to the plurality of framework arms 131 of the framework structure 103. The drive transmission 111 mechanically attaches to the drive axle 122 of the supporting mount 102. The drive transmission 111 receives rotational energy from the electric motor 112. The drive transmission 111 transfers the received rotational energy to the plurality of framework arms 131 of the framework structure 103 such that the plurality of framework arms 131 rotates between a deployed position and a retracted position. The drive transmission 111 further transfers the received rotational energy to the drive axle 122 such that the rotation of the drive axle 122 powers the operation of the supporting mount 102.

The electric motor 112 is an electric device. The electric motor 112 converts electric energy into rotational energy. The 24 electric motor 112 mechanically attaches to the drive transmission 111. The rotation of the electric motor 112 provides the rotational forces necessary for the operation of the drive transmission 111.

The control circuit 113 is an electric circuit. The control circuit 113 controls the operation of the electric motor 112. By controlling the operation of the electric motor 112 is meant that the control circuit 113 controls the speed of rotation of the electric motor 112. By controlling the operation of the electric motor 112 is further meant that the control circuit 113 controls the direction of rotation of the electric motor 112. The control circuit 113 is a remotely controlled device. The control circuit 113 comprises a logic module 141, a communication module 142, and a motor controller circuit 143.

The motor controller circuit 143 is an electric circuit. The motor controller circuit 143 electrically connects to the electric motor 112. The motor controller circuit 143 electrically connects to the logic module 141. The logic module controls the operation of the motor controller circuit 143. The motor controller circuit 143 controls the operation of the electric motor 112 based on inputs received from the logic 22 module 141. The motor controller circuit 143 controls the speed of rotation of the electric motor 112. The motor controller circuit 143 controls the direction of rotation of the electric motor 112.

The logic module 141 is a readily and commercially available programmable electronic device that is used to manage, regulate, and operate the control circuit 113. The communication module 142 is a wireless electronic communication device that allows the logic module 141 to wirelessly communicate with a personal data device 152. Specifically the communication module 142 establishes a wireless communication link 151 between the control circuit 113 and the personal data device 152 or other locally presented device. In the first potential embodiment of the disclosure the communication module 142 supports a communication protocol selected from the group consisting of a WiFi™ protocol or a Bluetooth™ protocol.

The personal data device 152 is a programmable electrical device. The personal data device 152 further comprises an application 153. The personal data device 152 provides data management and communication services through one or more functions referred to as an application 153. The application is a set of logical operating instructions that are performed by the personal data device 152. The addition of an application 153 will provide increased functionality for the personal data device 152. This disclosure assumes that an application 153 exists for the purpose of interacting with the invention 100. Methods to design and implement an application 153 on a personal data device 152 are well known and documented in the electrical arts. The application 153 of the personal data device 152 forms an interface between the control circuit 113. The personal data device 152 transmits operating instructions regarding the speed of rotation of the electric motor 112 over the wireless communication link 151 to the control circuit 113. The personal data device 152 transmits operating instructions regarding the direction of rotation of the electric motor 112 over the wireless communication link 151 to the control circuit 113. The communication module 142 receives the transmitted operating instructions and relays the received operating instructions to the logic module 141.

The supporting mount 102 is a mechanical structure. The supporting mount 102 forms a mechanical linkage with the drive mount 101. The drive mount 101 provides the motive force necessary to operate the supporting mount 102. The drive mount 101 controls the operation of the supporting mount 102. The supporting mount 102 physically attaches to the framework structure 103. The supporting mount 102 deploys the protected space formed by the framework structure 103 around the vehicle 161. The supporting mount 102 retracts the framework structure 103 to release the vehicle 161 from the protected space. The supporting mount 102 comprises a support gearing structure 121 and a drive axle 122.

The support gearing structure 121 is a mechanical structure. The support gearing structure 121 mechanically attaches to the plurality of framework arms 131 of the framework structure 103. The support gearing structure 121 mechanically attaches to the drive axle 122. The support gearing structure 121 receives rotational energy from the electric motor 112 through the drive axle 122. The support gearing structure 121 transfers the received rotational energy to the plurality of framework arms 131 of the framework structure 103 such that the plurality of framework arms 131 rotates between a deployed position and a retracted position.

The drive axle 122 is a rigid prism shaped structure. The drive axle 122 forms a shaft that attaches the support gearing structure 121 to electric motor 112 of the drive mount 101 such that the rotation of the electric motor 112 provides the rotational forces necessary to operate the support gearing structure 121.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Application or App: As used in this disclosure, an application or app is a self-contained piece of software that is especially designed or downloaded for use with a personal data device.

Axle: As used in this disclosure, an axle is a cylindrical shaft that is inserted through the center of an object such that the object can rotate using the axle as an axis of rotation.

Barrier: As used in this disclosure, a barrier is a physical obstacle that forms a boundary between a first space and a second space. The barrier prevents the passage of an object between the first space and the second space.

Bluetooth™: As used in this disclosure, Bluetooth™ is a standardized communication protocol that is used to wirelessly interconnect electronic devices.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Collapsible: As used in this disclosure, the terms collapsible refers to an object that is configured such that the volume of the object is adjustable. By volume is meant the volume of the perimetrical boundary that contains the object. The verbs collapse and retract mean that the volume of the perimetrical boundary of the object changes from a larger volume to a smaller volume. The verbs expand and deploy mean that the volume of the perimetrical boundary of the object changes from a smaller volume to a larger volume.

Communication Link: As used in this disclosure, a communication link refers to the structured exchange of data between two objects.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Drive: As used in this disclosure, a drive is a mechanism or a device that transmits a motive force from a first device or object to a second device or object with the objective of operating the second object.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Form Factor: As used in this disclosure, the term form factor refers to the size and shape of an object.

Framework: As used in this disclosure, a framework refers to a second object or structure that encloses a first object or structure.

Gear: As used in this disclosure, a gear is a toothed wheel, cylinder, or other toothed mechanical element that is used to transmit motion, a change of speed, or a change of direction to second toothed wheel, cylinder, or other toothed mechanical element.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Heating Element: As used in this disclosure, a heating element is a resistive wire that is used to convert electrical energy into heat. Common metal combinations used to form heat elements include a combination of nickel and Chromium (typical: 80/20), a combination of iron, chromium and aluminum (typical 70/25/5), a combination of copper, nickel, iron, and manganese (typical 66/30/2/2) (use for continuously hot), and platinum.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Mechanical Linkage: As used in this disclosure, a mechanical linkage is an interconnected arrangement of components that are used to manage the transfer of a movement or a force. A mechanical linkage is often referred to as a linkage.

Motor: As used in this disclosure, a motor refers to the method of transferring energy from an external power source into rotational mechanical energy.

Motor Controller: As used in this disclosure, a motor controller is an electrical device that is used to control the rotational speed, or simply the speed, and the direction of rotation of an electric motor. Motor controllers will generally receive one or more inputs which are used determine the desired rotational speed and direction of rotation of the electric motor.

Negative Space: As used in this disclosure, negative space is a method of defining an object through the use of open or empty space as the definition of the object itself, or, through the use of open or empty space to describe the boundaries of an object.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

Non-Euclidean Prism: As used in this disclosure, a non-Euclidean prism is a prism structure wherein the center axis of the prism lies on a non-Euclidean plane or is otherwise formed with a curvature.

Non-Euclidean Structure: As used in this disclosure, a non-Euclidean structure is a structure wherein: a) the non-Euclidean structure is formed with a non-Euclidean plane; b) the non-Euclidean structure has an axis that lies on a non-Euclidean plane or is otherwise formed with a curvature; or, c) a combination of both (a) and (b) above.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

PDD: As used in this disclosure, PDD is an acronym for personal data device.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld logical device that is used for managing personal information and communication. Examples of personal data device include, but are not limited to, cellular phones, tablets, and smartphones.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space;, b) maintains an environment suitable within the protected space that is appropriate for the object; or, c) protects the object within the protected space from potential 9 dangers that are outside of the protected space.

Remote Control: As used in this disclosure, remote control means the establishment of control of a device from a distance. Remote control is generally accomplished through the use of an electrical device that generates electrically based control signals that are transmitted via radio frequencies or other means to the device.

Rotation: As used in this disclosure, rotation refers to the cyclic movement of an object around a fixed point or fixed axis. The verb of rotation is to rotate.

Semisphere: As used in this disclosure, a semisphere is a structure formed in the shape of a half a sphere. Such a structure would be described as semispherical.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Sphere: As used in this disclosure, a sphere refers to a structure wherein every point of the surface of the structure is equidistant from a center point.

Textile: As used in this disclosure, a textile is a material that is woven, knitted, braided or felted. Synonyms in common usage for this definition include fabric and cloth. The two surfaces of the textile with the greatest surface area are called the faces of the textile.

Transmission: As used in this disclosure, a transmission is a device that transmits the energy of motion from a first location to a second location.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Water: As used in this disclosure, water (CAS 7732-18-5) is a molecule comprising two hydrogen atoms and one oxygen molecule. The phase of water at normal temperature and pressure is liquid. As used in this disclosure, the definition of water is expanded to include dilute water-based solutions of salts and ionic structures using water as the solvent. Water in a gas phase is often referred to as steam. Water in a solid phase is often referred to as ice. Snow refers to a bulk solid form of ice.

Weather: As used in this disclosure, the term weather refers to a collection of measurable parameters of the atmosphere including, but not limited to, temperature, humidity, precipitation, and air movement caused by wind and energy and illumination from the sun. A structure that isolates an individual or object from the more uncomfortable or destructive aspects of the weather is said to provide protection against the weather. The term elements is often used to refer to weather.

WiFi™: As used in this disclosure, WiFi refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling. With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A deployable vehicle cover comprising
a drive mount, a supporting mount, and a framework structure;
wherein the framework structure attaches to the drive mount and the supporting mount;
wherein the supporting mount forms a mechanical linkage with the drive mount;
wherein the deployable vehicle cover is configured for use with a vehicle;
wherein the deployable vehicle cover creates a protected space that contains the vehicle;
wherein the drive mount generates the motive forces necessary to deploy and retract the framework structure;
wherein the framework structure comprises a plurality of framework arms and a canopy structure;
wherein the canopy structure attaches to the plurality of framework arms;
wherein each of the plurality of framework arms attaches to a drive transmission in the drive mount;
wherein each of the plurality of framework arms attaches to a support gearing structure to in the supporting mount;
wherein each of the plurality of framework arms transfers a portion of the load of the canopy to the drive mount;
wherein each of the plurality of framework arms transfers a portion of the load of the canopy to the supporting mount.

2. The deployable vehicle cover according to claim 1
wherein the deployable vehicle cover is a mechanical device;
wherein the deployable vehicle cover protects the vehicle from the weather;
wherein the deployable vehicle cover is a collapsible structure;
wherein the deployable vehicle cover is a remotely controlled structure.

3. The deployable vehicle cover according to claim 2
wherein the framework structure forms the protected space that contains the vehicle;
wherein the drive mount is remotely controlled.

4. The deployable vehicle cover according to claim 3
wherein the framework structure is a mechanical structure;
wherein the framework structure is a rotating structure.

5. The deployable vehicle cover according to claim 4
wherein each of the plurality of framework arms is a non-Euclidean prism structure;
wherein each of the plurality of framework arms is a rigid structure;
wherein each of the plurality of framework arms is a load bearing structure;.

6. The deployable vehicle cover according to claim 5
wherein each of the plurality of framework arms is a rotating structure;

wherein each of the plurality of framework arms elevates the canopy structure above the vehicle when the framework structure is rotated into a deployed position.

7. The deployable vehicle cover according to claim 6
wherein the canopy structure is a sheeting structure;
wherein the canopy structure is a fluid impermeable structure;
wherein the canopy structure is a flexible structure;
wherein the canopy structure forms the protected space that encloses the vehicle when the plurality of framework arms are rotated into the deployed position;
wherein the canopy structure forms a folded structure when the plurality of framework arms are rotated into a retracted deployed position.

8. The deployable vehicle cover according to claim 7
wherein the drive mount is a mechanical structure;
wherein the drive mount physically attaches to the framework structure;
wherein the drive mount deploys the framework structure that forms the protected space around the vehicle;
wherein the drive mount retracts the framework structure to release the vehicle from the protected space;
wherein the drive mount is an electrically powered device.

9. The deployable vehicle cover according to claim 8
wherein the drive mount comprises the drive transmission, an electric motor, and a control circuit;
wherein the drive transmission is a mechanical structure;
wherein the drive transmission mechanically attaches to the plurality of framework arms of the framework structure;
wherein the drive transmission mechanically attaches to a drive axle of the supporting mount;
wherein the drive transmission receives rotational energy from the electric motor;
wherein the drive transmission transfers the received rotational energy to the plurality of framework arms of the framework structure such that the plurality of framework arms rotates between a deployed position and the retracted position;
wherein the drive transmission further transfers the received rotational energy to the drive axle such that the rotation of the drive axle powers the operation of the supporting mount;
wherein the electric motor converts electric energy into rotational energy;
wherein the electric motor mechanically attaches to the drive transmission;
wherein the rotation of the electric motor provides the rotational forces necessary for the operation of the drive transmission;
wherein the control circuit is an electric circuit;
wherein the control circuit controls the operation of the electric motor;
wherein controlling the operation of the electric motor means that the control circuit controls the speed of rotation of the electric motor;
wherein the control circuit is a remotely controlled device.

10. The deployable vehicle cover according to claim 9
wherein the supporting mount is a mechanical structure;
wherein the drive mount provides the motive force necessary to operate the supporting mount;
wherein the drive mount controls the operation of the supporting mount;
wherein the supporting mount physically attaches to the framework structure;
wherein the supporting mount deploys the framework structure that forms the protected space around the vehicle;
wherein the supporting mount retracts the framework structure to release the vehicle from the protected space.

11. The deployable vehicle cover according to claim 10
wherein the supporting mount comprises the support gearing structure and the drive axle;
wherein the support gearing structure is a mechanical structure;
wherein the support gearing structure mechanically attaches to the plurality of framework arms of the framework structure;
wherein the support gearing structure mechanically attaches to the drive axle;
wherein the support gearing structure receives rotational energy from the electric motor through the drive axle;
wherein the support gearing structure transfers the received rotational energy to the plurality of framework arms of the framework structure such that the plurality of framework arms rotates between the deployed position and the retracted position;
wherein the drive axle is a rigid prism shaped structure;
wherein the drive axle forms a shaft that attaches the support gearing structure to the electric motor of the drive mount such that the rotation of the electric motor provides the rotational forces necessary to operate the support gearing structure.

12. The deployable vehicle cover according to claim 11
wherein the control circuit comprises a logic module, a communication module, and a motor controller circuit;
wherein the motor controller circuit is an electric circuit;
wherein the motor controller circuit electrically connects to the electric motor;
wherein the motor controller circuit electrically connects to the logic module;
wherein the logic module controls the operation of the motor controller circuit;
wherein the motor controller circuit controls the operation of the electric motor based on inputs received from the logic module;
wherein the motor controller circuit controls the speed of rotation of the electric motor;
wherein the motor controller circuit controls the direction of rotation of the electric motor;
wherein the logic module is used to manage, regulate, and operate the control circuit;
wherein the communication module is a wireless electronic communication device that allows the logic module to wirelessly communicate with a personal data device;
wherein the communication module establishes a wireless communication link between the control circuit and the personal data device;
wherein the personal data device transmits operating instructions regarding the speed of rotation of the electric motor over the wireless communication link to the control circuit;
wherein the personal data device transmits operating instructions regarding the direction of rotation of the electric motor over the wireless communication link to the control circuit;
wherein the communication module receives the transmitted operating instructions and relays the received operating instructions to the logic module.

* * * * *